Aug. 21, 1928.
D. M. BLISS
1,681,459
ELECTRIC MOTOR CONTROL
Filed Nov. 20, 1924     2 Sheets-Sheet 1
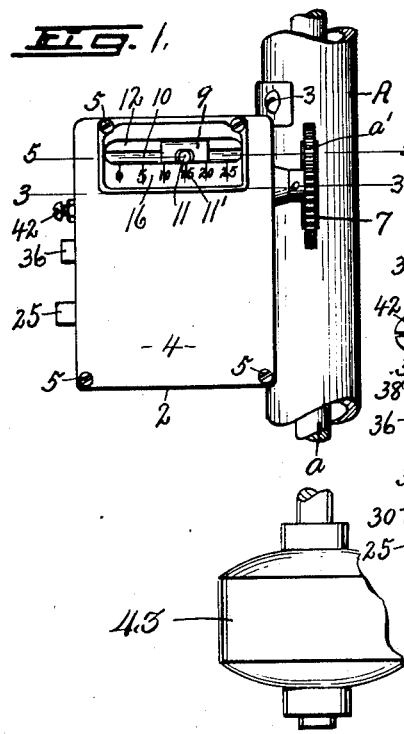
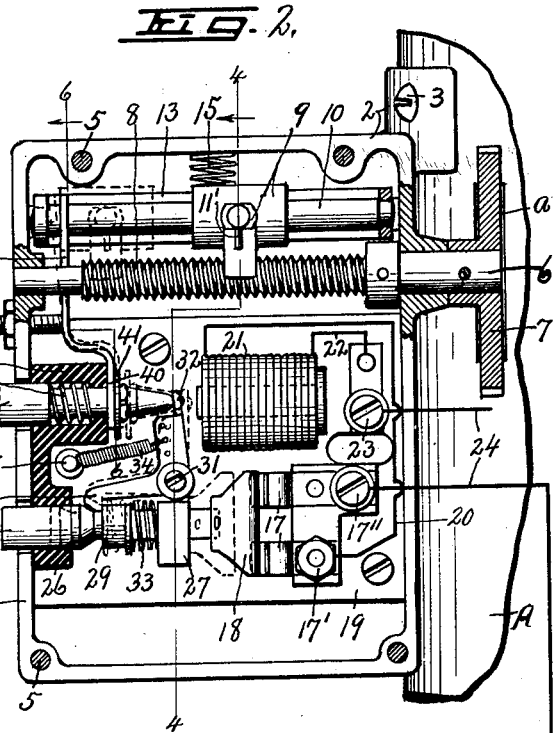
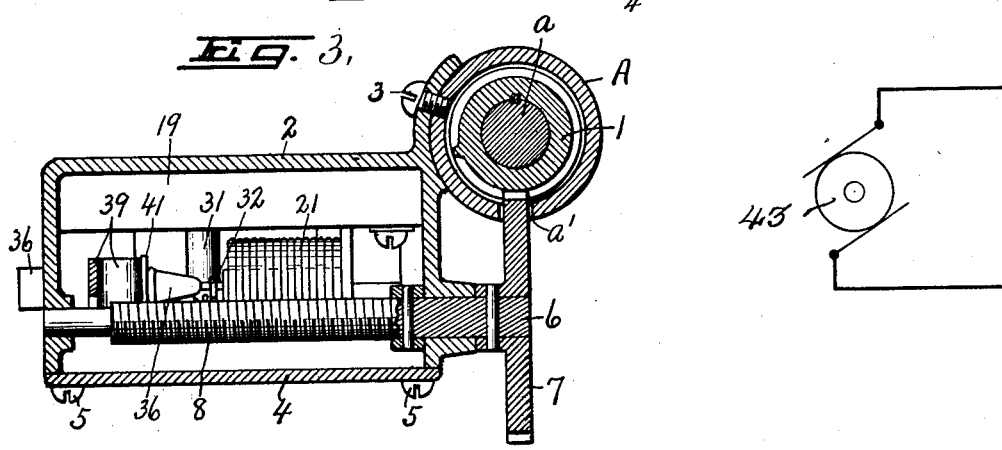
INVENTOR
D. M. Bliss
BY Denison & Thompson
ATTORNEYS
WITNESS
H. F. Hurst Aug. 21, 1928.
D. M. BLISS
1,681,459
ELECTRIC MOTOR CONTROL
Filed Nov. 20, 1924        2 Sheets-Sheet 2
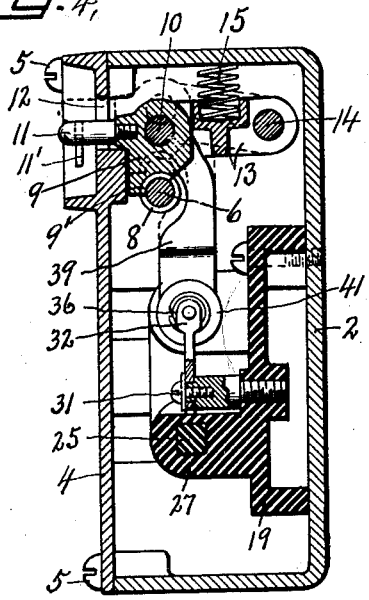
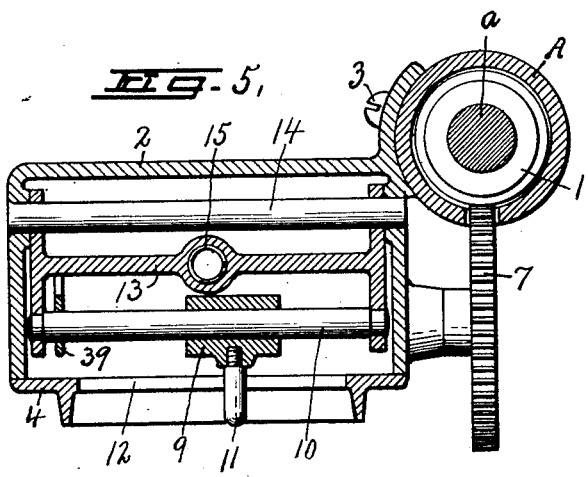
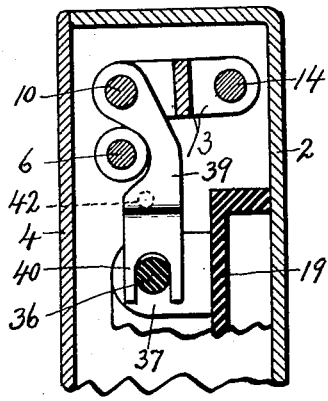
WITNESS
INVENTOR
D. M. Bliss
BY Denison & Thompson
ATTORNEYS Patented Aug. 21, 1928.

1,681,459

UNITED STATES PATENT OFFICE.

DONALD M. BLISS, OF SYRACUSE, NEW YORK, ASSIGNOR TO SYRACUSE WASHING MACHINE CORPORATION, OF SYRACUSE, NEW YORK, A CORPORATION OF NEW YORK.

ELECTRIC MOTOR CONTROL.

Application filed November 20, 1924. Serial No. 751,077.

This invention relates to an electric overload switch of the class set forth in my pending application Serial No. 698,393, filed Mar. 11, 1924, patented May 31, 1927, No. 1,630,650, in that it is adapted to be used in connection with electric motors for controlling the operation of any variable load translating device or devices such as a clothes washing and wringing mechanism and for automatically breaking the circuit in case of overload and thereby to prevent burning out of the armature or other parts of the motor circuit.

In many instances, these motors are operated intermittingly for greater or less periods of time according to the nature of the work so that in certain classes of work such as clothes washing, the actual time for completing each operation may be more or less accurately predetermined allowing the attendant to rest or perform other operations during such periods of time, and the main object of my present invention is to provide means adjustable at will for automatically stopping the motor at the end of such period.

In other words, I have sought to provide simple and efficient means adapted to be set by the operator whereby a motor-driven part may serve to automatically open an electric switch to break the circuit through the motor at the end of a predetermined interval of time of operation of said motor.

Other objects and uses relating to specific parts of the device will be brought out in the following description.

In the drawings:—

Figure 1 is a front elevation of an electric motor controlling switch and adjacent portion of a clothes washing machine showing a motor-driven shaft for operating the timing device.

Figure 2 is an enlarged front elevation, partly in section, of the parts shown in Figure 1, the cover being removed.

Figure 3 is an enlarged horizontal sectional view taken on line 3—3, Figure 1.

Figure 4 is a transverse vertical sectional view taken in the plane of line 4—4, Figure 2.

Figure 5 is an enlarged horizontal sectional view taken on line 5—5, Figure 1.

Figure 6 is a transverse vertical sectional view taken in the plane of line 6—6, Figure 2.

As illustrated, this device is used to control the operation of a motor-driven washing and drying machine having an upright stationary tubular post —A— and a motor-driven rotary shaft —a— extending therethrough, both of said parts being broken away, and the main body of the machine being omitted, the upright shaft —a— being provided with a worm —1— keyed or otherwise secured thereto to rotate therewith.

The controlling device comprises a case —2— adapted to be secured by screws —3— or other suitable fastening means to the periphery of the post —A— for receiving and supporting various parts of the controlling device presently described, said case being provided with a removable cover plate —4— normally held in place by screws —5— or equivalent fastening means to permit access to the interior mechanism, when necessary, for repairs or adjustments.

A horizontal shaft —6— is journaled in suitable bearings in opposite end walls of the case —2— and is provided with an external worm gear —7— meshing with the worm —1— for transmitting relatively slow rotary motion to the shaft —6—, the main portion of which is provided with relatively fine threads —8— extending nearly from end to end of the interior of the case for engaging and operating a movable nut —9— lengthwise thereof, and at a relatively slow rate of speed to be used in a manner presently described for breaking the motor circuit at the end of a predetermined interval of operation of the motor.

The nut —9— is preferably the segmental type slidable lengthwise of and upon a guide rod —10— and provided on its under side with a threaded segment —9'— adapted to engage about a quarter of the periphery of a limited portion of the threads —8— on the rotary shaft —6—, said nut being also pivotally mounted upon the guide rod —10— and provided with a suitable handle —11— extending through a lengthwise opening —12— in the front of the case —2— and elongated vertically a sufficient distance to permit the nut to be rocked about the axis of the rod —10— into and out of engagement with the threaded portion —8— of the shaft —6—.

The guide rod —10— is mounted in the front portion of a vertically swinging frame —13— which in turn is pivoted near its rear side to a longitudinally extending rod —14— having its ends suitably mounted in the end walls of the case —2— parallel with and in substantially the horizontal plane as the guide rod —10— as shown more clearly in Figure 5.

A spring —15— is interposed between the central portion of the swinging frame —13— and upper wall of the case —2— for yieldingly pressing the guide rod —10— toward the shaft —6— and thereby yieldingly holding the nut —9— in engagement with the threaded portion —8— of said shaft without interfering with the free movement of the nut into and out of engagement with the threads of the shaft by means of a handle —11— independently of the rocking movement of the frame, thus permitting the nut to be adjusted by hand to any desired position along the threads of the shaft and re-engaged with any part thereof.

The handle —11— is provided with a pointer —11'— movable along a suitable scale —16— on one of the walls of the opening —12— as shown in Figure 1, said scale being provided with suitable indicia such as numbers, gradually increasing in value, from the left side of the opening toward the right hand side for indicating time values, in this instance, from zero to twenty-five minutes in intervals of five minutes each or a definite number of cycles of operation of the translating device.

This nut —9— may be set by hand to register its pointer —11— with any one of the graduations of the scale —16— by simply lifting the handle —11— and moving the nut from left to right to bring its pointer into registration with the desired graduation after which, the nut is allowed to re-engage the threads —8— of the shaft —6— by its own weight, aided by the pressure of the spring —15— whereupon the rotation of the shaft —6— will automatically move the nut from the right hand toward the left hand end of the shaft or toward the zero graduation at which time, the movement of the nut causes the breaking of the motor circuit for automatically stopping the motor.

For example, if the time of continued operation of the translating device by the motor is to be twenty-five minutes, the nut —9— will be set by hand to register its pointer —11'— with the graduation —25— and will be operated by the rotation of the screw shaft —6— until its pointer reaches the zero graduation for automatically causing the breaking of the motor circuit and consequent stopping of the motor.

In like manner, the nut may be set to register with any other graduation with a similar result except that the duration of operation of the motor will be shortened.

This screw shaft —6— and nut —9— together with corelated parts, constitute what may be termed a timing device adapted to cooperate with any suitable circuit breaker or electric switch for controlling the time of continuous operation of the motor and translating devices operated thereby, and is particularly useful in connection with an overload switch adapted to automatically break the circuit in case of an overload upon the motor.

As illustrated, this overload switch comprises a pair of spring terminals —17— and a suitable contact member —18— movable into and out of contact therewith, the terminals —17— being mounted upon an insulating base —19—, in spaced insulated relation, as shown in my pending application previously referred to and are provided with binding posts —17'— and —17"—, one of which as —17'—, is connected by a wire —20— to one end of the winding of the electro-magnet —21—, the other end of said winding being connected by a wire —22— to a binding post —23— which together with the binding post —17'—, are adapted to be connected by wires —24— to an electric motor 43.

The movable switch member —18— is mounted upon the inner end of a rectilinearly movable operating member or push button —25— which is guided in suitable openings in spaced lugs or shoulders —26— and —27— on the base —19— and extends to the exterior of the case, the intermediate portion of the plunger being provided with an annular shoulder —29— adapted to be engaged by a detent —30— for holding the plunger in its innermost position and thereby holding the switch member —18— in electrical contact with the spring terminals —17— for closing the circuit through the motor and through the winding of the electro-magnet —21—.

The detent —30— is pivoted at —31— to the base —19— and is provided with an armature —32— preferably integral therewith and adapted to cooperate with the electro-magnet —21— for tripping the detent in case of an overload upon the motor, it being understood that the electro-magnet is constructed to carry a normal load upon the motor without being sufficiently energized to trip the detent and functions for that purpose only in case of an overload upon the motor.

A coil spring —33— is interposed between the lug —27— and shoulder —29— around the adjacent portion of the plunger —25— for automatically retracting the plunger and thereby opening the switch when the detent —30— is tripped.

Another coil spring —34— is connected to the armature —32— and to a post —35— on the base —19— for yieldingly holding the armature away from the core of the magnet —21— and also for yieldingly holding the detent —30— in engagement with the shoulder —29—, said spring being adjustable toward and from the axis of the armature and detent to vary the resistance to the action of said armature and detent, and thereby to provide a closer regulation of the operation of the detent by the magnet as may be necessary to cause the tripping of the detent at the proper time by the magnet.

Suitable means is also provided for tripping the detent at the will of the operator consisting in this instance. of a push button or plunger —36— movable in a suitable guide opening in a lug —37— on the base —19— coaxial with the axis of the magnet —21— and having its inner end adapted to engage the free end of the armature —32— and its outer end extended to the exterior of the case —2—, said plunger being parallel with the plunger —25— and within easy reaching distance thereform, by the fingers of the same hand of the operator.

A retracting spring —38— serves to yieldingly hold the plunger —36— in its outermost position and is preferably located within the guide opening in the lug —37—.

Suitable means is provided for transmitting motion from the axially movable nut —9— to the plunger —36— for causing the latter to engage the armature —32— and thereby to trip the detent —30— as the nut approaches the limit of its axial movement in one direction by the action of the screw shaft —6— thereon, said means consisting in this instance, of a floating bar or lever —39—having its lower end —40— slotted or forked and saddled upon the intermediate portion of the plunger —36— between the inner end of the guide lug —37— and a shoulder —41— on said plunger, the upper end of said bar or lever being provided with an opening for receiving the adjacent end of the guide rod —10— as shown more clearly in Figures 2 and 6.

That is, the bar or lever —39— is pivotally mounted upon the guide rod —10— to move vertically with the frame —13—, the slot in the lower end being elongated vertically to allow such movement which is made necessary to permit the nut —9— to be moved into and out of engagement with the threads of the screw shaft —6— as previously explained.

A fulcrum screw —42— is adjustably mounted in a threaded opening in the case —2— and is adapted to be engaged by the intermediate portion of the bar or lever —39— as a fulcrum therefor, when said bar is operated by the nut —9— at the limit of its movement in one direction by the screw shaft —6—, at which time, the upper end of the bar or lever —39— will be moved outwardly and axially by said nut forcing the intermediate portion of the bar against the inner end of the screw —42— as a fulcrum and thereby forcing the lower end of the bar inwardly to operate the plunger —36— against the armature —32— for tripping the detent —30— and allowing the retraction of the plunger —25— and its switch member —18— by the spring —33— for opening the switch and thereby breaking the circuit through the motor for stopping the latter.

In order that the switch box —2— and all parts carried thereby may be easily and quickly removed or attached to the machine driven by the motor, the post —A— is provided with an opening —a'— through which a portion of the gear —7— may project for engagement with the worm —1—.

*Operation.*

In starting a motor, the plunger —25— is pushed inwardly from the dotted line position to the full line position shown in Figure 2, which brings the member —18— into contact with the terminal —17— thereby closing the circuit through the motor and also through the electro-magnet —21—, at which time, the detent —30— will automatically interlock with the shoulder —29— to hold the switch in its closed position during the operation of the translating device actuated by the motor under normal load.

This locking operation of the detent retracts the armature —32— from the magnet —21—, and at the same time, assists the spring —38— in forcing the other push button or plunger —36— outwardly.

In case the motor is overloaded by the translating device, the electro-magnet —21— will be energized sufficiently to attract the armature —32— and thereby to trip the detent —30— and allow the spring —33— to open the switch, thus breaking the motor circuit and stopping the motor or if it is desired to stop the motor at any time while running under normal load conditions the push button —36— may be pressed inwardly to trip the detent with the same result of stopping the motor.

In the operation of the translating device, the nut —9— may be set to any one of the graduations of the scale —16— according to the time required for the continuous operation of the motor and translating device with the assurance that during the operation of the nut from the right hand to the left hand of the scale by means of the screw shaft —6—, the approach of the nut toward the limit of its movement in that direction against the upper end of the bar or lever —39— will rock the latter about the fulcrum of the screw —42— thereby effecting an inward movement of the plunger —36— against the armature —32— to trip the detent —30— and thereby to release the plunger —25— and allow the spring —33— to open the switch —18— for automatically stopping the motor at the end of movement of the nut —9—.

While this device is shown in connection with a combination washer and wringer mechanism in timing the continuous washing operation, it is evident that it may be applied to other driven translating devices without departing from the spirit of this invention.

I claim:

1. In an apparatus of the class described, an electric motor, a motor circuit, a motor driven member, means actuated by an over-load in said circuit for effecting the opening thereof, and additional means actuated by the driven member for causing the operation of a part of the first-named means to effect the opening of the motor circuit at the end of a predetermined running period of the driven member.

2. In an apparatus of the class described, an electric motor, a motor circuit, a motor driven rotary member, a self-opening electric switch in the motor circuit, a detent for holding the switch in the closed position, means actuated by an over-load in the motor circuit for tripping the detent, and additional means actuated by the motor driven member for tripping the detent at the end of a predetermined period.

In witness whereof I have hereunto set my hand this 7th day of November, 1924.

DONALD M. BLISS.